US007634474B2

(12) United States Patent
Vassilvitskii et al.

(10) Patent No.: US 7,634,474 B2
(45) Date of Patent: Dec. 15, 2009

(54) USING CONNECTIVITY DISTANCE FOR RELEVANCE FEEDBACK IN SEARCH

(75) Inventors: Serguei Vassilvitskii, San Francisco, CA (US); Eric D. Brill, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 273 days.

(21) Appl. No.: 11/393,480

(22) Filed: Mar. 30, 2006

(65) Prior Publication Data

US 2007/0239702 A1    Oct. 11, 2007

(51) Int. Cl.
*G06F 17/30*    (2006.01)
(52) U.S. Cl. .................. 707/5; 707/3; 707/4; 707/6
(58) Field of Classification Search ............. 707/1–7, 707/100, 200, 10, 101; 715/200, 700
See application file for complete search history.

(56) References Cited

U.S. PATENT DOCUMENTS

| | | | |
|---|---|---|---|
| 6,985,898 B1 * | 1/2006 | Ripley et al. ................ 707/5 |
| 7,028,050 B1 * | 4/2006 | Rose .................... 707/104.1 |
| 7,031,961 B2 * | 4/2006 | Pitkow et al. ............... 707/4 |
| 2003/0200205 A1 * | 10/2003 | Meiresonne ................ 707/3 |
| 2007/0038608 A1 * | 2/2007 | Chen ....................... 707/3 |

OTHER PUBLICATIONS

Beeferman, et al. Agglomerative Clustering of a Search Engine Query Log KDD (2000) pp. 407-416.

Belkin, et al. "Using Relevance Feedback and Ranking in Interactive Searching" (1996) 19 pages.
Jarvelin, et al. "IR Evaluation Methods for Retrieving Highly Relevant Documents" (2000) Proceedings of the 23rd Annual International ACM SIGIR conference on Research and Development in Information Retrieval pp. 41-48.
Jeh, et al. "Scaling Personalized Web Search" (2003) WWW, pp. 271-279.
Koenemann, et al. "A Study of Interactive Information Retrieval Behavior and Effectiveness" (1996) CHI, pp. 205-212.
Page, et al. "The PageRank Citation Ranking: Bringing Order to the Web" Technical Report, Stanford Digital Library Technologies Project (1998) 17 pages.
Qin, et al. "A Study of Relevance Propagation for Web Search" (2005) Proceedings of the 28th Annual International ACM SIGIR Conference on Research and Development in Information Retrieval, pp. 408-415.

(Continued)

*Primary Examiner*—Mohammad Ali
*Assistant Examiner*—Marc R Filipczyk
(74) *Attorney, Agent, or Firm*—Lee & Hayes, PLLC (57) ABSTRACT

A unique system and method is provided that facilitates improving relevance of search results over the initial searching ranking. The system and method involve obtaining relevancy feedback for at least one search result (user rated) and then generating a connectivity graph or web-graph (for Web searches) for the user rated result. The relative distance between results (or pages) in the graph can indicate relevancy between those results. Thus, results within a particular distance from the rated result can be considered related to the rated result and thus, relevant or irrelevant depending on the particular rating for that result. The connectivity graph can be employed to determine a re-ranking of the search results.

26 Claims, 7 Drawing Sheets

OTHER PUBLICATIONS

Rocchio, et al. "Relevance Feedback in Information Retrieval" (1971) The SMART Retrieval System: Experiments in Automatic Indexing, pp. 313-323.

Shakery, et al. "Relevance for Propagation for Topic Distillation UIUC Trec 2003 Web Track Experiments" (2003) Trec, pp. 673-677.

Teevan, et al. "Personalizing Search via Automated Analysis of Interests and Activities" (2005) Proceedings of the 28th Annual International ACM SIGIR Conference on Research and Development in Information Retrieval, pp. 449-456.

Vivisimo Search Engine. http://vivisimo.com/ last viewed Mar. 28, 2006, 1 page.

Yahoo! Mindset. http://mindset.research.yahoo.com/ last viewed Mar. 28, 2006, 1 page.

* cited by examiner

Re-ordered Search Results

- Saturn
  Views, animations, general information and data of the planet and its satellites.
  www.solarviews.com/eng/saturn.htm
  - Cached page
- NASA - Cassini-Huygens: Close Encounter with Saturn
  Saturn's northern hemisphere has a new look since NASA's Voyager spacecraft flew by the planet in 1980. It now appears deep blue, much like the deep, clear atmospheres of Uranus and Neptune
  www.nasa.gov/mission_pages/cassini/main/index.html
  - Cached page
  - 2/21/2006
- Saturn
  General information, some statistical data and links.
  www.nineplanets.org/saturn.html
  - Cached page
- Cassini-Huygens Home
  Explore the beautiful ringed planet Saturn and its moon Titan, and learn about the spacecraft currently on their way there.
  saturn.jpl.nasa.gov/home/index.cfm
  - Cached page
- Cassini-Huygens Home
  Starting in 2004, the spacecraft will explore Saturn, its mysterious rings and its many moons. The Cassini spacecraft will orbit the ringed planet for four years
  saturn.jpl.nasa.gov/index.cfm
  - Cached page
  - 2/21/2006
  - Show more results from "saturn.jpl.nasa.gov"

USING CONNECTIVITY DISTANCE FOR RELEVANCE FEEDBACK IN SEARCH

BACKGROUND

Despite much advancement in search technologies, search in general is still an unsolved problem. Take web search for example. Although relevance of results has steadily improved over the past decade, anecdotal evidence indicates that many queries still go unanswered. A major obstacle to further improvement of search results is understanding user intent from the query. The problem is exacerbated by the fact that the average query length is between two and three words, and average query sessions consist of only a handful of queries.

The brevity of most search queries is a recognized problem, and several methods have been proposed to deal with this scenario. The approaches can be divided into passive and active systems. Passive systems observe user behavior and try to infer more information about the users' intent from their previous actions. In this area numerous personalized search algorithms have been suggested and implemented in practice. These algorithms reweigh each query asked by the users based on their stated preferences or past search histories.

On the other hand, active systems engage in some interaction with the user that better elicit user intent. This interaction can take many different forms. For example, one conventional search engine clusters the results and lets the user navigate the cluster hierarchy; while another lets users re-rank the results, giving more influence to "Shopping" or "Research" results. Other work has explored the space of query suggestion. This involves presenting a list of possible query expansions to help the user further narrow down the results. Unfortunately, none if any of these approaches have produced significant improvements in more accurate or more relevant search results in the context of Web searches or desktop searches.

SUMMARY

The following presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

The subject application relates to a system(s) and/or methodology that facilitate increasing relevancy in search results by examining a connectivity distance between a search result and its related neighbors. The systems and methods presented herein can be based on the underlying link structure of the Web, for example, in Web search scenarios. Hence, given a query, relevant objects tend to point to other relevant objects and irrelevant objects tend to point to other irrelevant objects. This relationship holds true for direct links, but perhaps more importantly, can be maintained as the distance between objects increases.

As described in further detail below, the subject systems and methods involve obtaining user feedback on at least one result returned to the user. The rated result is analyzed to determine the result's connections to other objects that may or may not have been included in the initial set of search results. At least a subset of the search results can be re-ordered (or re-ranked) to move the most relevant objects to the top of the list according to the feedback for a particular result. Thus, if a result was noted as relevant to a query, then any other objects neighboring this result are most likely relevant to the query and can be re-ordered to appear at least closer to the top of the results list. The re-ranking can be accomplished in part by constructing a connectivity graph (or web-graph for web search results). The connectivity graph can be generated for each rated object to determine distances between the rated object and other objects that appear in the search results. Shorter distances between such objects tend to indicate a closer relationship between them. Therefore, the graph can be used to readily determine those objects that are relevant or irrelevant for a given query.

To the accomplishment of the foregoing and related ends, certain illustrative aspects of the invention are described herein in connection with the following description and the annexed drawings. These aspects are indicative, however, of but a few of the various ways in which the principles of the invention may be employed and the subject invention is intended to include all such aspects and their equivalents. Other advantages and novel features of the invention may become apparent from the following detailed description of the invention when considered in conjunction with the drawings.

BRIEF DESCRIPTION OF THE DRAWINGS

FIG. 4 is a screenshot of a list of web results for a query: saturn.

DETAILED DESCRIPTION

The subject systems and/or methods are now described with reference to the drawings, wherein like reference numerals are used to refer to like elements throughout. In the following description, for purposes of explanation, numerous specific details are set forth in order to provide a thorough understanding of the systems and/or methods. It may be evident, however, that the subject systems and/or methods may be practiced without these specific details. In other instances, well-known structures and devices are shown in block diagram form in order to facilitate describing them.

As used herein, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

Throughout the discussion below, experimental results based on exemplary training sets of data are presented to further support or illustrate various aspects of the subject application. It should be appreciated and understood that such experiments are not intended to limit the scope of the systems and methods described herein to particular scenarios, operating conditions or applications but are provided as examples. Moreover, the subject application can be employed with respect to any type of searching performed on the Internet, on a remote or local server or storage facility, or on any computing device or network.

Figure 1:
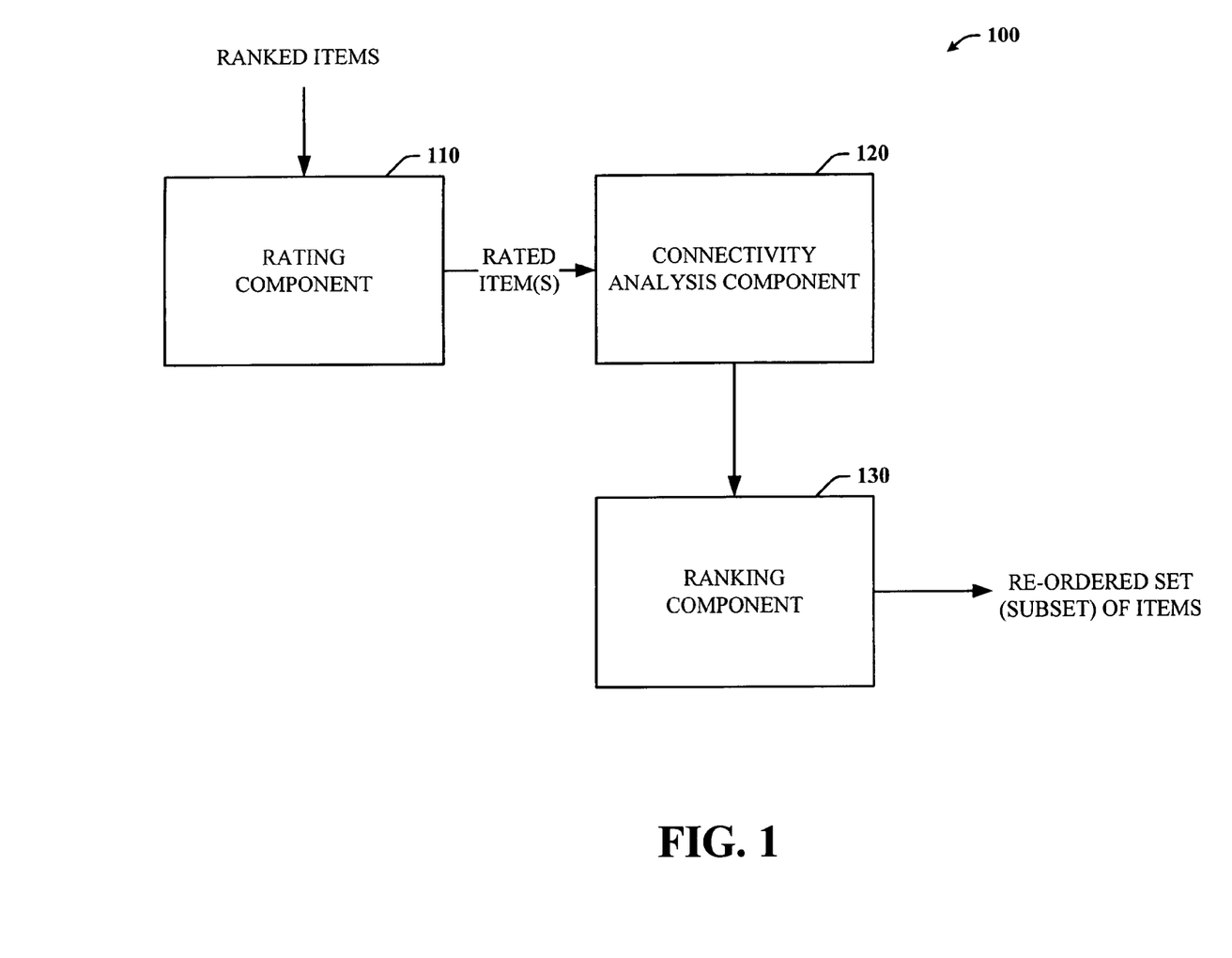
FIG. 1 is a block diagram of a system that facilitates providing a set of objects or an ordered set of objects according to relevancy feedback.

Referring now to FIG. 1, there is a general block diagram of a system 100 that facilitates returning a set of objects according to the relevancy feedback on at least a subset of those objects. The system 100 is premised on the connectivity structure of objects rather than on their content to improve the quality of search results. The system 100 includes a rating component 110 that can receive and/or analyze a rating of at least one object provided in a set of search results. Objects can include any type of search result such as web pages or URLs, photos, documents, and the like.

Assuming that at least one object is rated, the rated object can undergo an analysis of its connections to other objects and the distance there between via a connectivity analysis component 120. The component 120 can examine the links from the rated object to other neighboring objects including those objects not directly connected to the rated object. In particular, the component 120 can construct a connectivity graph and determine the distance between the rated object and any other object that it can explicitly or implicitly point to and ascertain their relative relevancy. Based on this examination, the set of objects initially returned to the user can be re-ordered or re-ranked by a ranking component 130, thereby improving the quality of the search results for the given query.

In general, the rating options can include text voting buttons or numerical values such as a 0 to indicate that the object is not relevant to the present query and a 1 to indicate that it is relevant. The system 100 can also accommodate degrees of relevancy and re-order search results based on varying degrees of relevancy. For instance, three rating options can be presented: 0 for not relevant; 1 for somewhat relevant; and 2 for very relevant. The connectivity analysis component 120 can account for these different levels when looking at the rated object's neighbors.

Contrary to the subject system 100, traditional text-based relevance feedback approaches do not perform well, particularly in web search scenarios. The systems and methods discussed herein involve an algorithm that is based on the underlying link structure of the pertinent object network (e.g., the Web) rather than the content. Such traditional techniques look at the content of rated objects and re-rank search results according to an analysis of the object's content. For example, if a search result for "Saturn" relating to the planet and its moons is rated as "relevant," then the traditional approach extracts key words from the object and re-orders objects with similar words to the top of the list.

Figure 2:
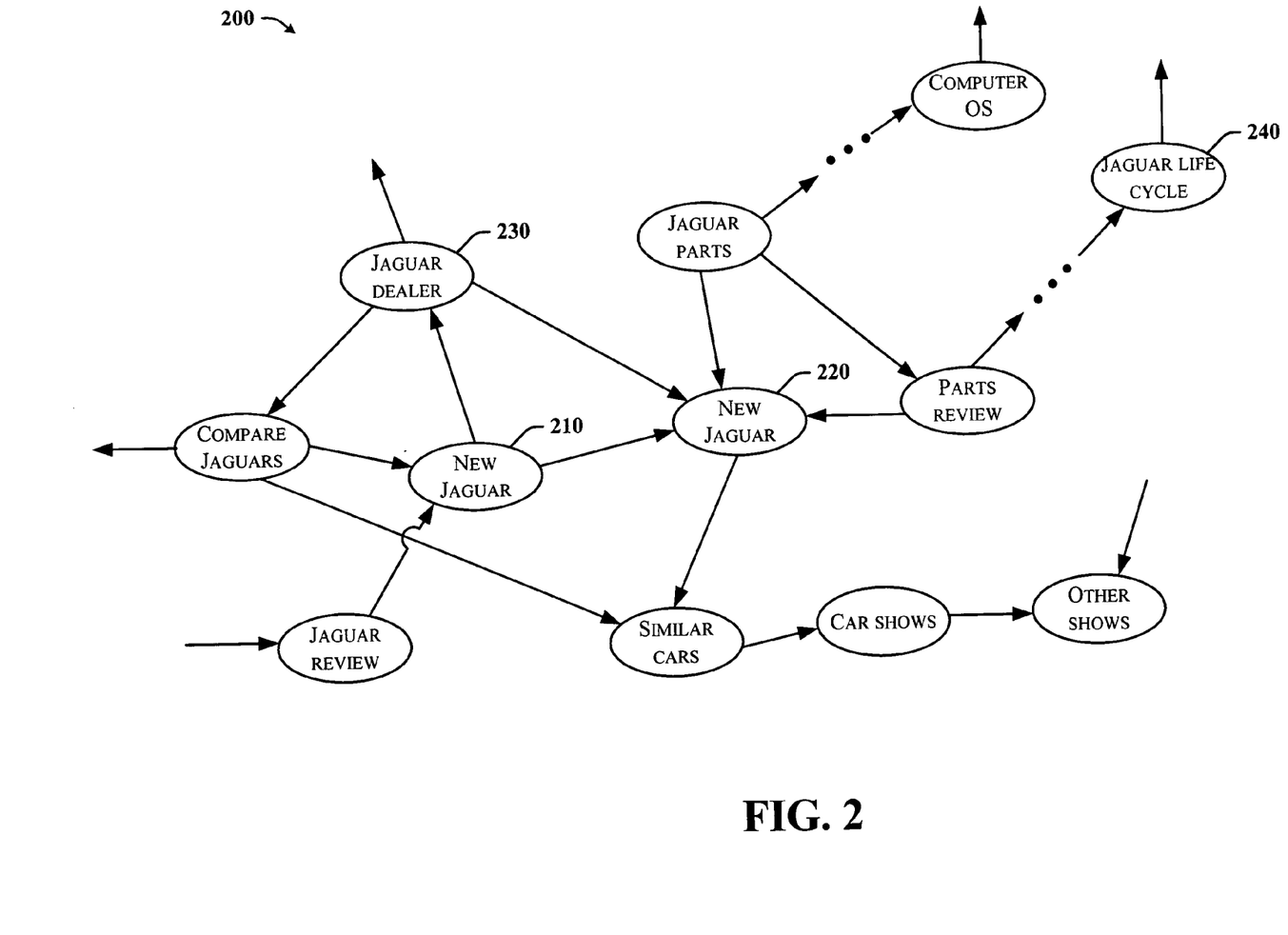
FIG. 2 demonstrates a distribution of inlinks that supports the subject relevancy feedback technique.

This notion of relevance propagation employed in the system 100 has not been previously applied in an interactive search setting to improve the quality of the search results. Specifically, objects relevant to a user's query intent (e.g., "pages" in a Web context) tend to point to other objects relevant to a user's query intent, while irrelevant objects are pointed to by other irrelevant objects for a particular query even as the distance between the objects increases. This can be especially evident with respect to word sense disambiguation that can occur when submitting a search request. Consider the query jaguar. Commercial search engines return URLs about Jaguar the automobile brand, Jaguar the Apple OS, and jaguar the wild animal. To limit the results to one of the word meanings, we must add special keywords like "car" or "computer." However, this information is already encoded in a web-graph. A schematic representation of a partial web-graph 200 for Jaguar is illustrated in FIG. 2. The web-graph distance between two pages (210, 220) talking about the new Jaguar car model is typically much smaller than the distance between an automotive page (210, 220, or 230) and a page 240 describing the life-cycle of jaguars (relative distance indicated by the ellipsis). For example, many of the car pages can link to the official website for the automobile (e.g., jaguar.com).

Spam sites continue to be prevalent on the Web as a distraction from legitimate sites or links. For example, it is well known that travel search results are often spammed by travel agency affiliates, all using the same back-end search engine to advertise their fares. Again, the web-graph distance between these sites is usually small as they all link to the same travel affiliates, whereas almost no highly relevant page would point to any of the spam sites.

User intent can also be vague based on the query terms. Consider the query cancer. The list of relevant results can include general information about the disease, scientific papers on latest breakthroughs, homeopathic remedies, or local support groups. The intent of the user is not clear from the search term, yet all of these results form well linked clusters in the web-graph. For instance, it is highly unlikely that scientific papers would link to support groups.

In the context of Web searches, experimental data based on an exemplary set of human-labeled data demonstrates that web-graph-based relevance feedback increases the average relevancy of the query results, while classic techniques are of limited help and can sometimes be detrimental to the overall rankings. The results were based on the following dataset: a set of 9500 queries were selected at random from those posed to a commercially available search engine. For each of the queries, between 4 and 30 URL results were presented to the human judges, who rated the relevance of the page on a scale of 1 (poor) to 5 (perfect). The test data included a set of 150,000 (e.g., query, URL, rating) triples. Note that ratings are query dependent and a particular URL can be rated as perfect for one query and poor for another.

The data was used to evaluate the performance of the system and to simulate user interaction. For each query, the rated URLs were split into a training set and a test set. The human supplied relevance scores were given to the algorithm for the URLs present in the training set. The algorithm is then evaluated on its performance on URLs in the test set. The split was varied into training and test sets to simulate different user scenarios. For example, the number of documents was changed in the training set from one to five and different selection rules for URLs were also experimented with in the training set to simulate different degrees and types of user feedback.

Consider a random triple, and examine its relevance. A set of URLs W and a query q can be denoted by $Pr_q(W)$—the probability distribution over relevance of all of the pages in W. Since all of the experiments that were conducted are query based, the q can be dropped from the notation to leave Pr(W). For two URLs u and v we say that u is connected to v and write u $\leadsto$ v if there exists a directed path of length at most 4 in the web graph from u to v.

Let $Q_i(W)=Pr(\{w \in W | v \leadsto w$ and $Relevance(v)=i\})$. This is a distribution of relevance of the pages that can reach a page of relevance i within 4 hops in the web-graph. Similarly let $R_i(W)=Pr(\{w \in W | w \leadsto v$ and $Relevance(v)=i\})$. A skew in the distribution of $Q_i(W)$ should be observed as compared to Pr(W) if the underlying assertions are correct. In particular, if relevant pages tend to point to other relevant pages then the average value of $Q_5(W)$ should be higher than baseline. Likewise if only irrelevant pages point to known irrelevant pages then a skew towards lower values should be observed in $R_i(W)$, especially in $R_1(W)$.

According to the experimental data results, the distribution of inlinks to an irrelevant page is skewed towards being irrelevant, while the distribution of outlinks of a relevant page is skewed towards being relevant. Although the signal provided by the web-graph is somewhat noisy, there is a clear skew in the two distributions, validating the underlying assertions. Similar experiments were performed ignoring the directionality of the graph edges, so that the path from u to v could follow edges both forwards and backwards. The signal present in the directed case disappears once the edges are treated as undirected. Hence, the directionality plays a role in the underlying assertions.

One of the main parameters implicit in this experiment is the number of URLs that the user is required to rate for the method to achieve good improvements. Experimental studies show that many of the results are highly interconnected in the web-graph. As expected, the larger the size of the user rated results, the better the performance of the re-ranker, both in the NDCG (Normalized Discounted Cumulative Gain) and recall metrics. A testament to the interconnectedness of the web is the surprising result that even ranking a single URL can produce noticeable improvements in the quality of the ranking. When the rated results were chosen uniformly at random from the result set, the results demonstrate that increasing the size of the training set from 1 user rated result to 5 user rated results increases both the NDCG change and the effective recall.

The other tunable parameter is the selection of the URL to be ranked. Clearly ranking some URLs is going to be more beneficial than others. Consider the changes in re-rankings by testing four different training set selection methods. In all cases the training set consisted of one URL.

Random: Pick a URL uniformly at random from the result set.

Top-Ranked: Select the URL that is top ranked by the search engine, since this is the URL that the user will always see and evaluate.

Most-Linked: In this scheme the URL selected has the most number of connections to other URLs in the result set. This is the URL that is expected to affect the ranking the most.

Oracle: For every query, the experiment is run where every possible URL for the training set is selected, and the best result is recorded.

The results of these experiments demonstrate the effect of different selection rules on the performance of the re-ranking system/method. More specifically, the experimental results indicate that asking the user to rate the top ranked element can be detrimental to the relevance feedback mechanism and that the rating of the most linked result gives the highest recall.

Of the three non-oracle selection methods, it is not surprising that "most-linked" achieves the highest effective recall. This method also achieves the highest NDCG change. In addition, the experiments show that in many cases the top result is "special" in a sense that rating the top result can be detrimental to the overall search re-ranking. This implies that it is best to present a set of URLs (or objects) to rate to the user, rather than allowing him to pick URLs to rate. The latter method will invariably lead to the user rating the top result, since this is the result most often evaluated when judging the results.

Figure 3:
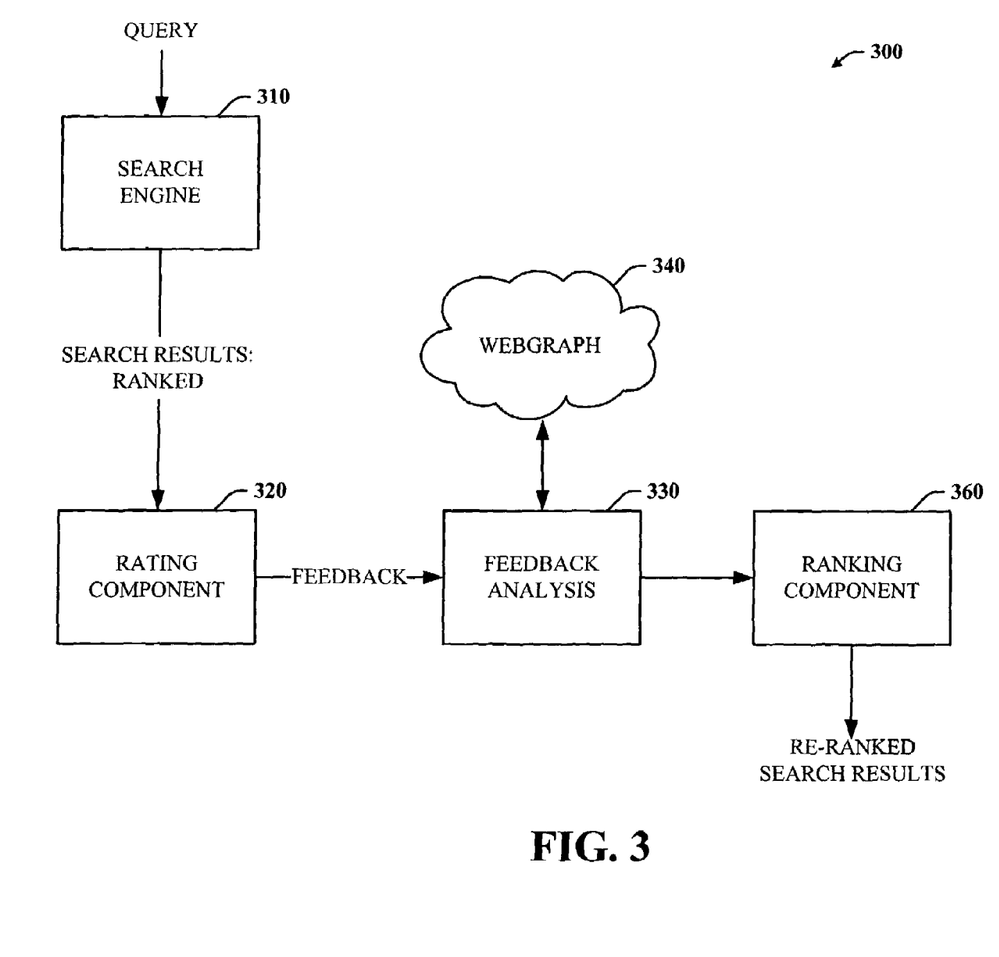
FIG. 3 is a block diagram of a system that facilitates providing a set of re-ordered web search results according to relevancy feedback.

In practice, for example, the system 300 as shown in FIG. 3 can be employed to improve the quality of web search results. Using the principles and assertions previously described, a user can provide feedback on at least one search result returned by a search engine 310. For example, imagine that the user has entered a query: Saturn; and a number of web pages are returned. The user can provide feedback to at least one of the web pages in the list to note whether the particular page is relevant to his query. This can be accomplished in part by a rating component 320. FIG. 3 represents an exemplary list of web page results for this query returned by a commercially available search engine. Because there are multiple interpretations of the word saturn, the search results list includes web pages directed to the Saturn car, the planet, and an individual whose last name is Saturn.

In this case, suppose that the user intended to search for the planet. He can select a page dealing with the planet and rate it appropriately to indicate that it is relevant to his query. This feedback can then be analyzed (via a feedback analysis component 330) with respect to a web-graph 340 corresponding to this page. If a result further down on the list 400 is selected (e.g., FIG. 4), it will invariably have more objects, or pages in this scenario, linked or connected to it—compared to the page 410 listed at the top of the results list 400. Assuming that the user rates the page 420, a pruned web-graph of the rated page can be generated and examined and a ranking component can apply the re-ranking algorithm to re-order at least a subset of the pages (search results) according to the relevancy feedback.

Let Ranked be the set of pages whose relevance is revealed by the user. Recall that $Q_i$ (respectively $R_i$) is the probability distribution for the page with an incoming (respectively outgoing) path to a page of relevance i. Let P=Pr(W) be the baseline probability. The algorithm maintains a relevance distribution for each page in the result set. It is first initialized to the baseline distribution and is then updated every time an m-hop (e.g., where m≧4) path exists between the page and one of the user rated URLs. Finally the most probable relevance score is selected and is combined with the page score returned by the original search engine (310). The algorithm is presented below:

```
 1: for all Unrated URLs u do
 2:     Let U_p be a probability distribution P
 3:     for all Rated URLs v do
 4:         if v is relevant and v ↝ u then
 5:             U_p = U_p + Q_{rating(v)}
 6:         else if v is not relevant and u ↝ v then
 7:             U_p = U_p + R_{rating(v)}
 8:         end if
 9:     end for
10:     NewScore(u) = OldScore(u) + γ · max(U_p)
11: end for
12: Return results sorted by NewScore
```

To combine the two scores, γ was varied from 0 to 1.0. The value of γ=0.1 consistently gave the optimum results.

Figure 5:
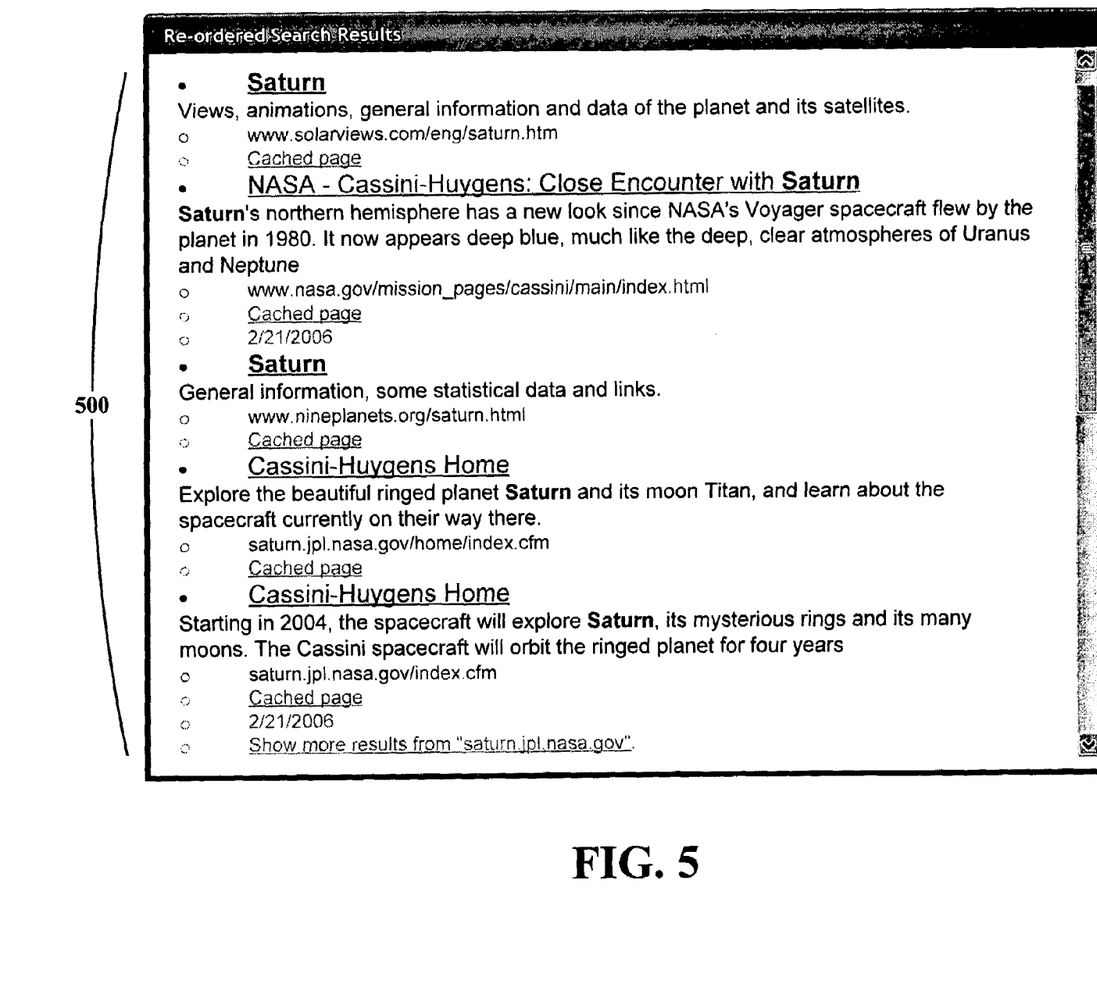
FIG. 5 is a simulated re-ordered list of at least a subset of search results from FIG. 4 that can be obtained using the system of FIGS. 1 and 3.

Following, the list of search results can be re-ordered or re-ranked via the search engine 310 in FIG. 3 to yield a new list 500 of results such as the one shown in FIG. 5. The list 500 includes pages directed to the planet Saturn that were either previously provided to the user in the original results list or were "added" to the list based on the relevancy calculations. The list 500 of results can be truncated to exclude the pages deemed irrelevant by the feedback analysis component 330. Alternatively, the pages found not to be relevant or perhaps less relevant can be re-ordered to the bottom or near the bottom of the list.

To compare the performance of the system (e.g., FIG. 1, 100; FIG. 3, 300) relative to conventional relevancy feedback techniques, the Normalized Discounted Cumulative Gain measure (NDCG) can be employed. Formally, NDCG is defined as:

$$\text{Score} = N \sum_i (2^{r(i)} - 1) / \log(1 + i)$$

where the sum is over all of the URLs for the query in the dataset, r(i) is the relevance of document i and N is a normalizing constant chosen so that the score is always between 0 and 1. There are several advantages to using NDCG as a performance metric. The rating is always between 0 and 1 regardless of the number of URLs returned for the query and the position of higher ranked documents affects NDCG much more than the position of lower ranked documents.

The results of the subject re-ranking system and method as presented earlier in this discussion can be compared against two benchmarks. The first is the actual result ranking present as judged by the particular commercial search engine. The subject re-ranking approach should improve upon this benchmark since it can utilize the original commercial search scores in its re-ranking function. Furthermore, the subject results can be compared to those of conventional relevance feedback techniques, in particular the Rocchio metric. The Rocchio metric has been to known to often help in many information retrieval situations.

The subject re-ranking approach consistently outperforms the Rocchio metric in all three situations. The major downside of the Rocchio metric is its tendency to change the ranking of the results even when they are in perfect order. When plotted, this would be demonstrated by a negative NDCG change from the baseline. The re-ranking component/system, on the other hand, consistently improves the average NDCG of the queries. It is important to note that the improvement is greatest when it would be of most help to the user. In other words, when the original results are ranked in a poor order, and the perfect result is buried somewhere underneath, the re-ranking system appears to be the most helpful. The Rocchio feedback measure also leads to larger improvements when the original NDCG is low. However, it also decreases the average NDCG when the original score is high, whereas the subject re-ranker does not change the ordering on those pages.

Various methodologies will now be described via a series of acts. It is to be understood and appreciated that the subject system and/or methodology is not limited by the order of acts, as some acts may, in accordance with the subject application, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject application.

Figure 6:
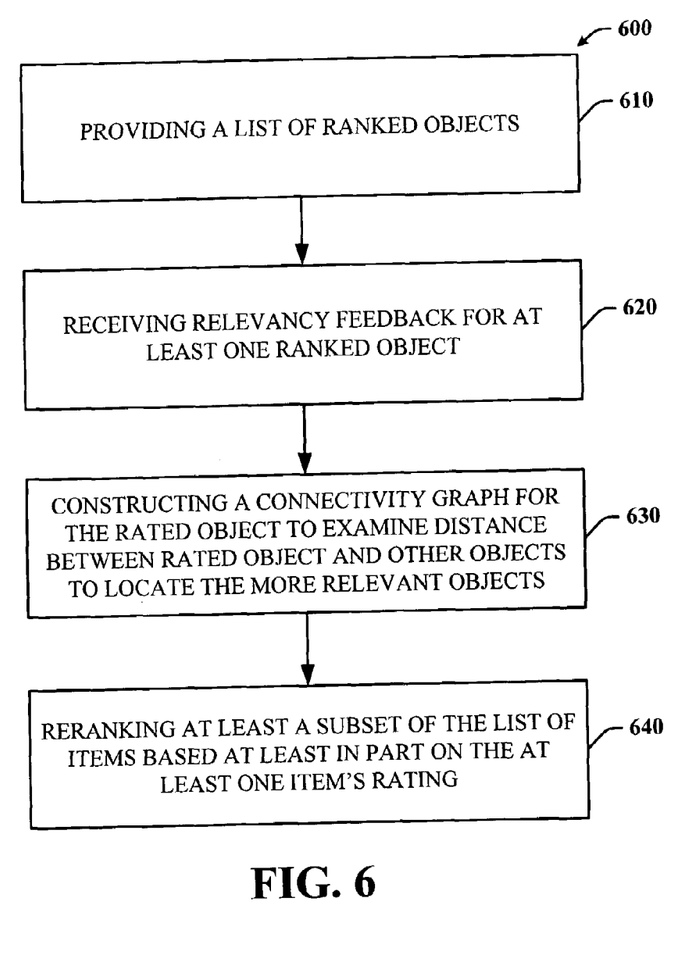
FIG. 6 is a flow diagram illustrating an exemplary methodology that facilitates improving the quality of search results based on the connectivity distance between results.

Turning now to FIG. 6, there is a flow diagram that facilitates improving the relevance of search results over the initial search ranking by obtaining relevancy feedback. The method involves providing a list of objects or search results at 610. Objects can include any type of search result such as web pages or URLs, photos, documents, and the like. At 620, the rating or relevancy feedback for at least one object or search result can be received. A connectivity graph (or web-graph in the context of Web searches) can be constructed at 630 based on the relevancy feedback for the object or search result. The connectivity graph can assist in determining which other objects or results are more closely linked to the rated object given the underlying premise of the method 600—which is that relevant objects point to relevant objects and irrelevant objects are pointed to by other irrelevant objects. Thus, an object ten hops away, for example, may be considered "too far" from the rated object and thus not relevant to the rated object. The number of hops can be set to a maximum parameter so that the method can perform most efficiently.

Based on this examination, the set of objects initially returned to the user can be re-ordered or re-ranked at 640, thereby improving the quality of the search results for the given query. It should be appreciated that in some cases, the original list of search results may not change even after subjected to the re-ranking process for reasons previously discussed herein.

Figure 7:
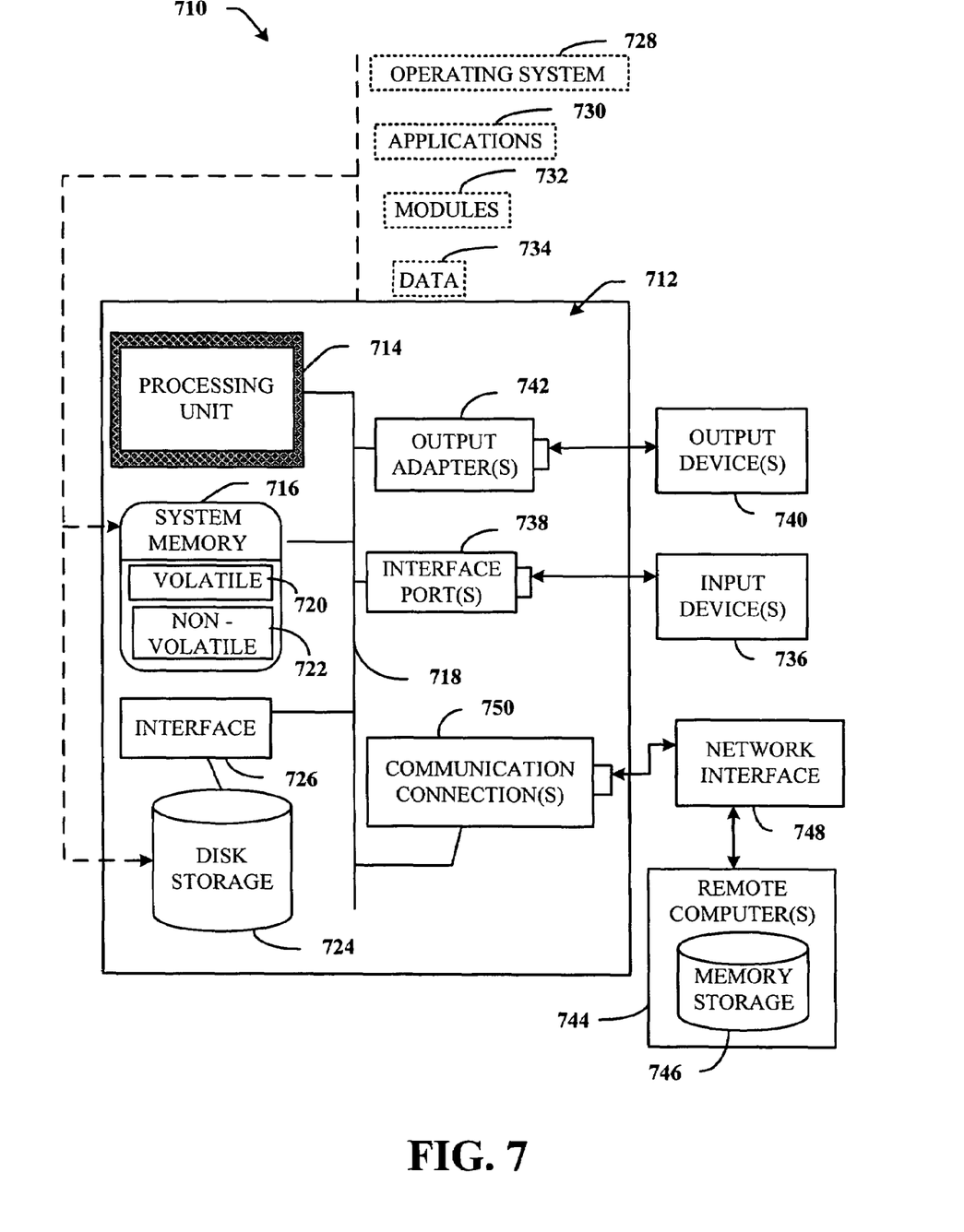
FIG. 7 illustrates an exemplary environment for implementing various aspects of the invention.

In order to provide additional context for various aspects of the subject invention, FIG. 7 and the following discussion are intended to provide a brief, general description of a suitable operating environment 710 in which various aspects of the subject invention may be implemented. While the invention is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 710 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 7, an exemplary environment 710 for implementing various aspects of the invention includes a computer 712. The computer 712 includes a processing unit 714, a system memory 716, and a system bus 718. The system bus 718 couples system components including, but not limited to, the system memory 716 to the processing unit 714. The processing unit 714 can be any of various available processors. Dual microprocessors and other multiprocessor architectures also can be employed as the processing unit 714.

The system bus 718 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MCA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 716 includes volatile memory 720 and nonvolatile memory 722. The basic input/output system (BIOS), containing the basic routines to transfer information between elements within the computer 712, such as during start-up, is stored in nonvolatile memory 722. By way of illustration, and not limitation, nonvolatile memory 722 can include read only memory (ROM), programmable ROM (PROM), electrically programmable ROM (EPROM), electrically erasable ROM (EEPROM), or flash memory. Volatile memory 720 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 712 also includes removable/nonremovable, volatile/nonvolatile computer storage media. FIG. 7 illustrates, for example a disk storage 724. Disk storage 724 includes, but is not limited to, devices like a magnetic disk drive, floppy disk drive, tape drive, Jaz drive, Zip drive, LS-100 drive, flash memory card, or memory stick. In addition, disk storage 724 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 724 to the system bus 718, a removable or non-removable interface is typically used such as interface 726.

It is to be appreciated that FIG. 7 describes software that acts as an intermediary between users and the basic computer resources described in suitable operating environment 710. Such software includes an operating system 728. Operating system 728, which can be stored on disk storage 724, acts to control and allocate resources of the computer system 712. System applications 730 take advantage of the management of resources by operating system 728 through program modules 732 and program data 734 stored either in system memory 716 or on disk storage 724. It is to be appreciated that the subject invention can be implemented with various operating systems or combinations of operating systems.

A user enters commands or information into the computer 712 through input device(s) 736. Input devices 736 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 714 through the system bus 718 via interface port(s) 738. Interface port(s) 738 include, for example, a serial port, a parallel port, a game port, and a universal serial bus (USB). Output device(s) 740 use some of the same type of ports as input device(s) 736. Thus, for example, a USB port may be used to provide input to computer 712 and to output information from computer 712 to an output device 740. Output adapter 742 is provided to illustrate that there are some output devices 740 like monitors, speakers, and printers among other output devices 740 that require special adapters. The output adapters 742 include, by way of illustration and not limitation, video and sound cards that provide a means of connection between the output device 740 and the system bus 718. It should be noted that other devices and/or systems of devices provide both input and output capabilities such as remote computer(s) 744.

Computer 712 can operate in a networked environment using logical connections to one or more remote computers, such as remote computer(s) 744. The remote computer(s) 744 can be a personal computer, a server, a router, a network PC, a workstation, a microprocessor based appliance, a peer device or other common network node and the like, and typically includes many or all of the elements described relative to computer 712. For purposes of brevity, only a memory storage device 746 is illustrated with remote computer(s) 744. Remote computer(s) 744 is logically connected to computer 712 through a network interface 748 and then physically connected via communication connection 750. Network interface 748 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 750 refers to the hardware/software employed to connect the network interface 748 to the bus 718. While communication connection 750 is shown for illustrative clarity inside computer 712, it can also be external to computer 712. The hardware/software necessary for connection to the network interface 748 includes, for exemplary purposes only, internal and external technologies such as, modems including regular telephone grade modems, cable modems and DSL modems, ISDN adapters, and Ethernet cards.

What has been described above includes examples of the subject system and/or method. It is, of course, not possible to describe every conceivable combination of components or methodologies for purposes of describing the subject system and/or method, but one of ordinary skill in the art may recognize that many further combinations and permutations of the subject system and/or method are possible. Accordingly, the subject system and/or method are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates improving the quality of search results comprising:

physical memory that stores data pertinent to a result of a search query initiated by a searching entity;

a searching component that returns a list of search results from a search query;

a rating component that obtains from the searching entity a pertinence rating of at least one of the results returned from the search query, the pertinence rating indicates at least one of multiple a degrees of relevancy of the rated results;

a connectivity analysis component that examines connections between the rated results and unrated results of the search query and constructs a connectivity graph between the rated results and the unrated results, the connectivity graph provides a set of connectivity distances between the rated results and one or more of the unrated results, wherein the connectivity distance is based on the number of hops or links between the rated results and the unrated results;

a ranking component that re-ranks the rated object and a subset of the other results based in part on the pertinence rating and a subset of the connectivity distances;

wherein the ranking component truncates the initial list of search results to exclude non-relevant objects from display in a re-ranked search result list;

wherein the rated results link to one or more unrated results directly, or through a series of links or hops;

wherein if a rated search result has a pertinence rating that indicates that the rated search result is relevant, then all pages the rated search result links to within a given number (m) of links will be included in the truncated search results; and wherein the number m is a number that is greater than or equal to 2.

2. The system of claim 1, wherein the connectivity analysis component determines that results which are a threshold connectivity distance from the at least one rated object are relevant to the rated result.

3. The system of claim 1, wherein the ranking component selects and combines a most probable relevance score with an original result score returned by an original search engine.

4. The system of claim 1, wherein the rating component at least one of:
outputs a request to obtain a rating for a most-linked object of the result of the search query; or
modifies a presentation of the result of the search query to indicate that a rating for the most-linked object is an optional input.

5. The system of claim 1, wherein the rating component selects at least one result to be rated that is chosen in at least one of the following manners: randomly, top-ranked, or most-linked.

6. The system of claim 3, wherein the ranking component employs an algorithm of the form NewScore=OldScore+ y*max($U_p$) to combine the most probable relevance score with the original result score, where y is a constant having a value between 0.05 and 0.25, OldScore is the original result score, and $U_p$ is a probability distribution of the relevancy of the search results, calculated by adding the baseline probability that a given search result in a set of search results will be relevant and the distribution of relevance for the unrated search results that can be reached within the number m hops or links from the rated search results.

7. The system of claim 6, wherein y is substantially 0.1.

8. The system of claim 1, wherein the connectivity distance between at least any two results increases as their relevance to one another decreases.

9. A method for facilitating improvement in the quality of search results, the method comprising:
obtaining a result of a search query initiated by a searching entity;
storing in a physical memory data pertinent to the result of a search query;
returning, by a searching component, a list of search results from a search query;
obtaining, by a rating component from the searching entity, a pertinence rating of at least one of the results returned from the search query, the pertinence rating indicates at least one of multiple a degrees of relevancy of the rated results;
examining, by a connectivity analysis component of a computer configured to facilitate improvement in the quality of search results, connections between the rated results and unrated results of the search query and constructs a connectivity graph between the rated results and the unrated results, the connectivity graph provides a set of connectivity distances between the rated results and one or more of the unrated results, wherein the connectivity distance is based on the number of hops or links between the rated results and the unrated results;

re-ranking, by a ranking component, the rated object and a subset of the other results based in part on the pertinence rating and a subset of the connectivity distances;

truncating, by the ranking component, the initial list of search results to exclude non-relevant objects from display in a re-ranked search result list;

wherein the rated results link to one or more unrated results directly, or through a series of links or hops;

wherein if a rated search result has a pertinence rating that indicates that the rated search result is relevant, then all pages the rated search result links to within a given number (m) of links will be included in the truncated search results; and wherein the number in is a number that is greater than or equal to 2.

10. The method of claim 9 further comprising determining, by the connectivity analysis component, that results which are a threshold connectivity distance from the at least one rated object are relevant to the rated result.

11. The method of claim 9 further comprising selecting and combining, by the ranking component, a most probable relevance score with an original result score returned by an original search engine.

12. The method of claim 11 further comprising employing, by the ranking component, an algorithm of the form NewScore=OldScore+y*max($U_p$) to combine the most probable relevance score with the original result score, where y is a constant having a value between 0.05 and 0.25, OldScore is the original result score, and $U_p$ is a probability distribution of the relevancy of the search results, calculated by adding the baseline probability that a given search result in a set of search results will be relevant and the distribution of relevance for the unrated search results that can be reached within the number m hops or links from the rated search results.

13. The method of claim 12, wherein y is substantially 0.1.

14. The method of claim 9 further comprising outputting, by the rating component, a request to obtain a rating for a most-linked object of the result of the search query.

15. The method of claim 9 further comprising selecting, by the rating component, at least one result to be rated that is chosen in at least one of the following manners: randomly, top-ranked, or most-linked.

16. The method of claim 9, wherein the connectivity distance between at least any two results increases as their relevance to one another decreases.

17. The method of claim 9 further comprising modifying, by the rating component, a presentation of the result of the search query to indicate that a rating for the most-linked object is an optional input.

18. One or more computer-readable media having computer-executable instructions embodied thereon so that, when executed, performs a method for facilitating improvement in the quality of search results, the method comprising:
obtaining a result of a search query initiated by a searching entity;
storing in a physical memory data pertinent to the result of a search query;
returning, by a searching component, a list of search results from a search query;
obtaining, by a rating component from the searching entity, a pertinence rating of at least one of the results returned from the search query, the pertinence rating indicates at least one of multiple a degrees of relevancy of the rated results;

examining, by a connectivity analysis component, connections between the rated results and unrated results of the search query and constructs a connectivity graph between the rated results and the unrated results, the connectivity graph provides a set of connectivity distances between the rated results and one or more of the unrated results, wherein the connectivity distance is based on the number of hops or links between the rated results and the unrated results;

re-ranking, by a ranking component, the rated object and a subset of the other results based in part on the pertinence rating and a subset of the connectivity distances;

truncating, by the ranking component, the initial list of search results to exclude non-relevant objects from display in a re-ranked search result list;

wherein the rated results link to one or more unrated results directly, or through a series of links or hops;

wherein if a rated search result has a pertinence rating that indicates that the rated search result is relevant, then all pages the rated search result links to within a given number (m) of links will be included in the truncated search results; and wherein the number m is a number that is greater than or equal to 2.

19. One or more computer-readable media of claim 18, the method further comprising determining, by the connectivity analysis component, that results which are a threshold connectivity distance from the at least one rated object are relevant to the rated result.

20. One or more computer-readable media of claim 18, the method further comprising selecting and combining, by the ranking component, a most probable relevance score with an original result score returned by an original search engine.

21. One or more computer-readable media of claim 20, the method further comprising employing, by the ranking component, an algorithm of the form NewScore=OldScore+ y*max($U_p$) to combine the most probable relevance score with the original result score, where y is a constant having a value between 0.05 and 0.25, OldScore is the original result score, and $U_p$ is a probability distribution of the relevancy of the search results, calculated by adding the baseline probability that a given search result in a set of search results will be relevant and the distribution of relevance for the unrated search results that can be reached within the number m hops or links from the rated search results.

22. One or more computer-readable media of claim 21, wherein y is substantially 0.1.

23. One or more computer-readable media of claim 18, the method further comprising outputting, by the rating component, a request to obtain a rating for a most-linked object of the result of the search query.

24. One or more computer-readable media of claim 18, the method further comprising modifying, by the rating component, a presentation of the result of the search query to indicate that a rating for the most-linked object is an optional input.

25. One or more computer-readable media of claim 18, the method further comprising selecting, by the rating component, at least one result to be rated that is chosen in at least one of the following manners: randomly, top-ranked, or most-linked.

26. One or more computer-readable media of claim 18, wherein the connectivity distance between at least any two results increases as their relevance to one another decreases.

* * * * *